United States Patent
Glicklich et al.

(10) Patent No.: US 8,213,340 B1
(45) Date of Patent: Jul. 3, 2012

(54) SYSTEM AND METHOD FOR MANAGING A NODE SPLIT ACROSS MULTIPLE NETWORK ELEMENTS

(75) Inventors: Barry Glicklich, Warrenville, IL (US); David Allabaugh, Lombard, IL (US); Philippe Wilson, Montreal (CA)

(73) Assignee: Tellabs Operations, Inc., Naperville, IL (US)

( * ) Notice: Subject to any disclaimer, the term of this patent is extended or adjusted under 35 U.S.C. 154(b) by 878 days.

(21) Appl. No.: 11/203,787

(22) Filed: Aug. 15, 2005

(51) Int. Cl.
*H04L 12/28* (2006.01)
(52) U.S. Cl. ...................................................... 370/258
(58) Field of Classification Search .................. 370/218, 370/235, 395.51, 535
See application file for complete search history.

(56) References Cited

U.S. PATENT DOCUMENTS

| | | | | |
|---|---|---|---|---|
| 5,014,268 A * | 5/1991 | Tyrrell et al. | | 370/374 |
| 6,108,309 A * | 8/2000 | Cohoe et al. | | 370/241 |
| 6,147,968 A * | 11/2000 | De Moer et al. | | 370/225 |
| 6,876,625 B1 * | 4/2005 | McAllister et al. | | 370/221 |
| 6,920,113 B1 * | 7/2005 | Kovvali et al. | | 370/255 |
| 7,345,993 B2 * | 3/2008 | Venema | | 370/222 |
| 2001/0038612 A1 * | 11/2001 | Vaughn et al. | | 370/256 |
| 2002/0141425 A1 * | 10/2002 | Merani et al. | | 370/412 |
| 2002/0191617 A1 * | 12/2002 | Duplessis et al. | | 370/400 |
| 2007/0025364 A1 * | 2/2007 | Kodialam et al. | | 370/400 |

\* cited by examiner

*Primary Examiner* — Donald Mills
*Assistant Examiner* — Wanda Russell
(74) *Attorney, Agent, or Firm* — Hamilton, Brook, Smith & Reynolds, P.C.

(57) ABSTRACT

A telecommunication network includes a communication ring having a plurality of nodes. The communication ring includes a plurality of links wherein each link interconnects one node to another node. Each node includes one or more network elements. Management functions for the nodes, the communication ring, the links, and the network elements are provided by a manager. The manager can discover and define the nodes, the links, and the communication ring and establish more than one network element at a node. The manager provides a coherent view of the telecommunication network despite a node being supported by more than one network element.

27 Claims, 6 Drawing Sheets

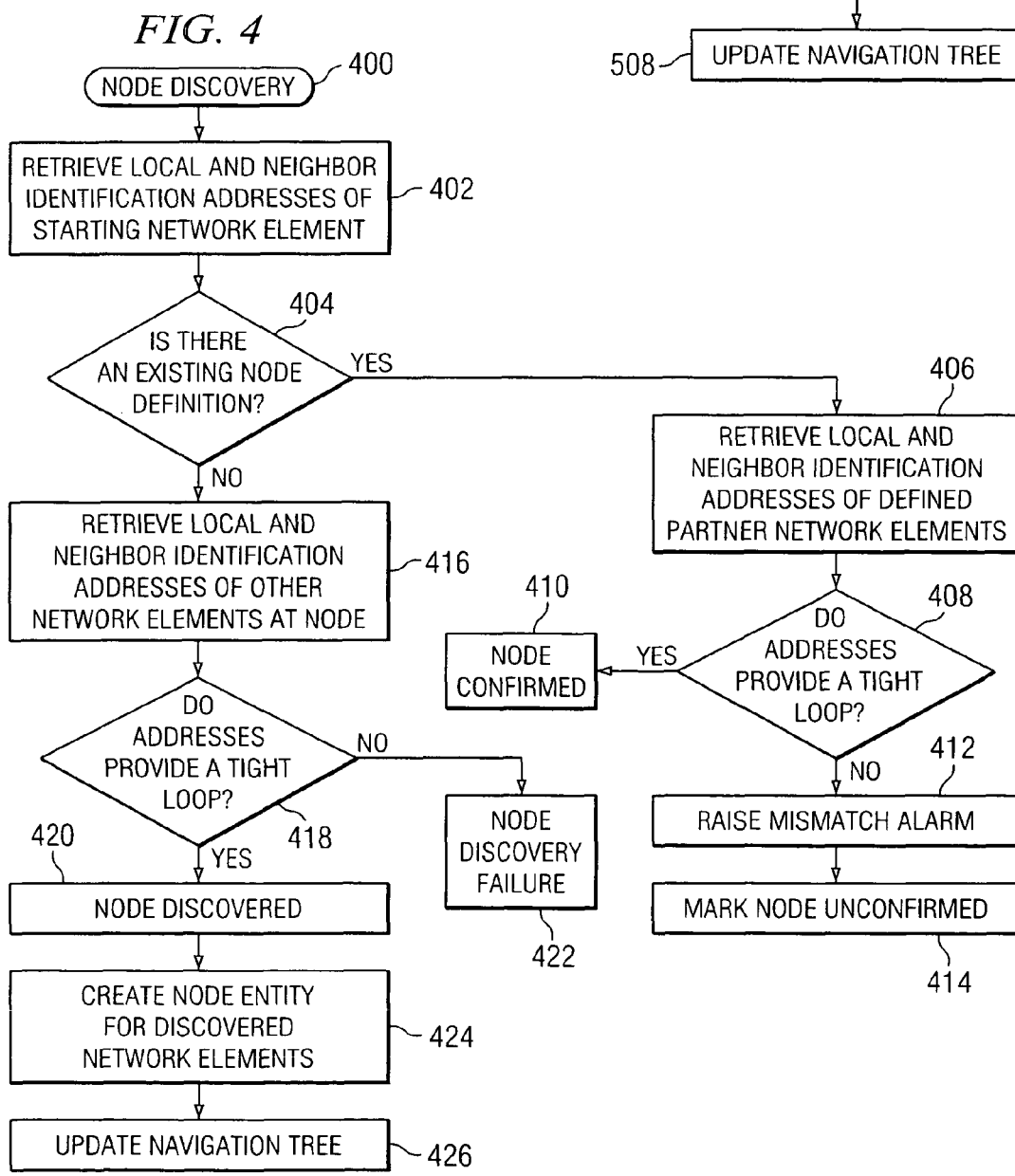

SYSTEM AND METHOD FOR MANAGING A NODE SPLIT ACROSS MULTIPLE NETWORK ELEMENTS

TECHNICAL FIELD OF THE INVENTION

The present invention relates in general to telecommunication network management techniques and more particularly to a system and method for managing a node split across multiple network elements.

BACKGROUND OF THE INVENTION

In conventional telecommunication networks, a node and its functionality is contained in a single network element. That network element is capable of providing full management of the node. However, telecommunication functionalities may be distributed across multiple network elements. Full management of distributed telecommunication functionalities becomes difficult to implement within an individual node.

SUMMARY OF THE INVENTION

From the foregoing, it may be appreciated by those skilled in the art that a need has arisen for a technique to manage telecommunication functionalities within a node that are distributed over multiple network elements. In accordance with the present invention, a system and method for managing a node split across multiple network elements are provided that substantially eliminate or greatly reduce disadvantages and problems associated with conventional telecommunication network management techniques.

According to an embodiment of the present invention, there is provided a system for managing a node split across multiple network elements that includes a communication ring having a plurality of links. The plurality of links couple a plurality of nodes in the communication ring. A particular one of the plurality of nodes has at least two network elements supported therein. A manager is operable to provide a coherent view of the two network elements in the particular node of the communication ring. In this manner, a manager can identify a node as being supported by two or more network elements and manage the telecommunication network according to how the functionalities of the particular node are split across the two or more network elements.

The present invention provides various technical advantages over conventional telecommunication network management techniques. Some of these technical advantages are shown and described in the description of the present invention. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which:

FIG. 4 illustrates a process flow for node discovery in the telecommunication network;

FIG. 5 illustrates a process flow for defining a node in the telecommunication network;

DETAILED DESCRIPTION OF THE INVENTION

Figure 1:
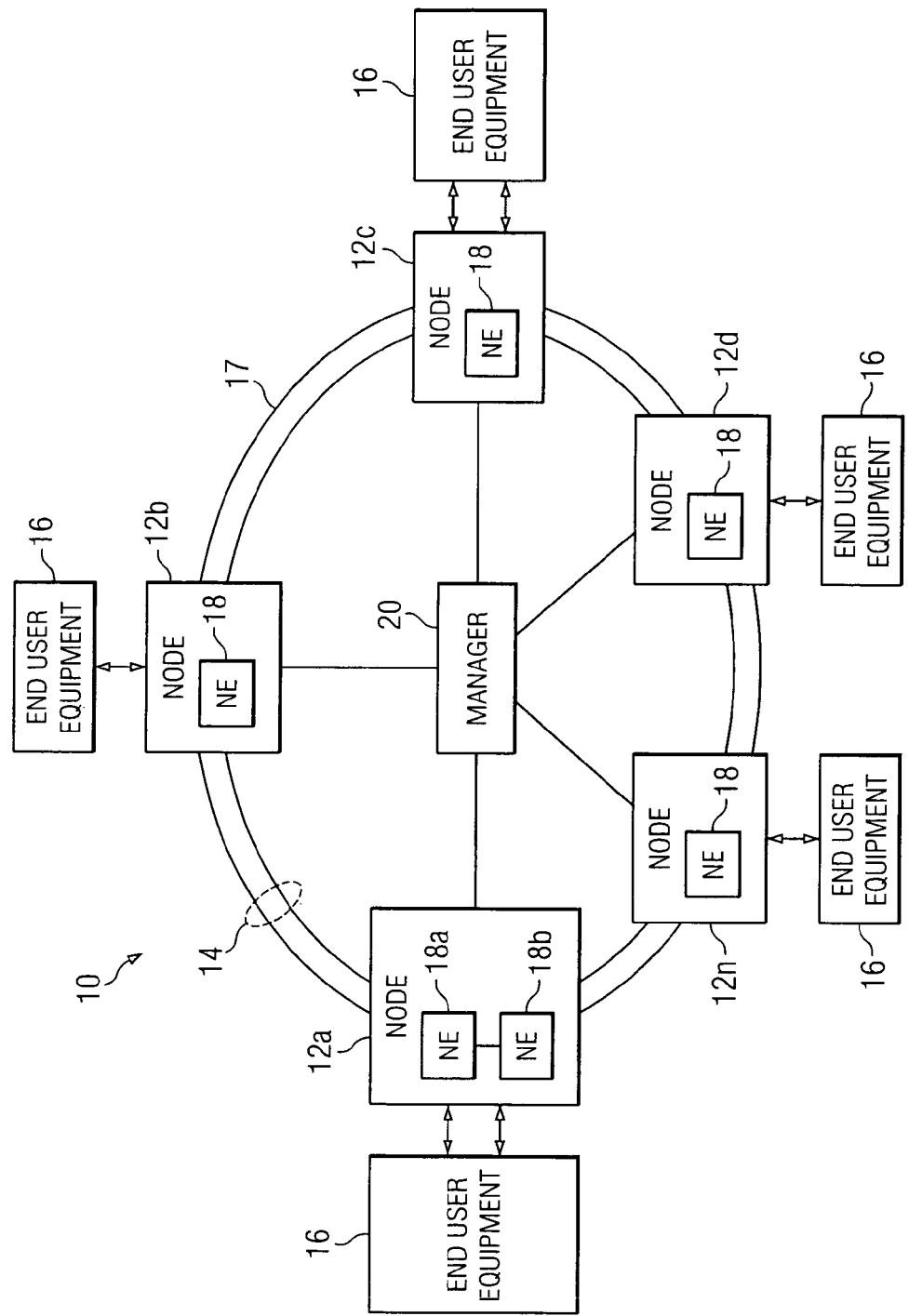
FIG. 1 illustrates a simplified block diagram of a telecommunication network.

FIG. 1 shows a block diagram of a telecommunication network 10. Telecommunication network includes a plurality of nodes 12, specifically identified as 12a-n. The plurality of nodes 12 are coupled to one another by a communication ring 14. Communication ring 14 may be implemented as one or more bidirectional links or one or more unidirectional links. Typically, for protection purposes, communication ring 14 has either two bidirectional links or four unidirectional links interconnecting nodes 12. Communication ring 14 may establish a stand alone network, may be part of a multi-ring network, and may include linear spans to provide ring protection of a wavelength circuit across a dense wavelength division multiplexing (DWDM) network. However, communication ring 14 may be implemented in any manner and design according to a desired transport operation. Each node 12 provides a communication interface to the communication ring 14 for one or more end user telecommunication elements 16. Each node 12 includes one or more network elements 18 that communicate with respective end user telecommunication elements 16. For telecommunication network 10, end user telecommunication elements 16 may be a subscriber's telephone, a node for another telecommunication network, a routing device, or any other type of telecommunication device. Each node 12 includes one or more network elements 18.

As shown in FIG. 1, a particular node 12a includes a first network element 18a and a second network element 18b. Network elements 18a and 18b provide the telecommunication functionality for node 12a within telecommunication network 10. Network elements 18a and 18b may provide redundant operation to protect against a failure in either element, overflow operation to handle telecommunication data exchanges when one of the elements is at full capacity, or independent operation for telecommunication data exchange as desired. Network elements 18a and 18b may include line termination units that provide from zero to any number of connections to end user telecommunication elements 16.

Figure 2:
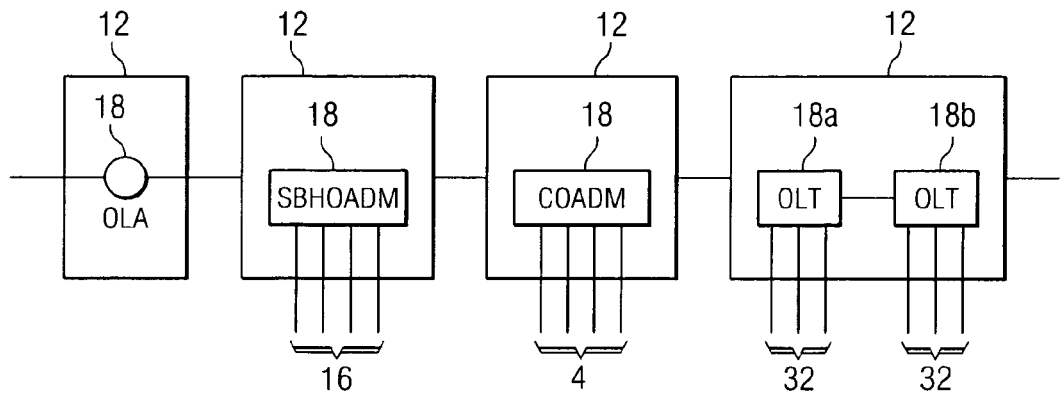
FIG. 2 illustrates a simplified block diagram of a network element in the telecommunication network.

FIG. 2 shows examples of network elements 18a and 18b. Network elements 18a and 18b may be deployed using compact optical add-drop multiplexers (COADM), single bay hub optical add-drop multiplexers (SBHOADM), back to back optical line terminals (OLT), optical line amplifiers (OLA), and SONET Multiplexer Transponder Modules (SMTM) as nodes 12 on communication ring 14. Other conventional devices known to those skilled in the art may be used as network elements 18. Each network element 18 may provide zero drops as a conventional OLA, four drops like a conventional COADM, sixteen drops like a SBHOADM, and thirty-two drops like a conventional OLT. Each network element 18 may have any other number of drops as desired. For purposes of discussion, an OLT is shown for each of network elements 18*a* and 18*b*.

Referring back to FIG. 1, telecommunication network 10 includes a manager 20 that supports management of communication ring 14 and network elements 18 at a physical and logical level. Functions capable of being performed by or through manager 20 include discovering and defining a node 12 and an OLT pair as a node 12, a DWDM link, a network topology, and an interconnection path between two network elements 18. Manager 20 may also delete a node 12, a DWDM link, a communication ring 14, and an interconnection path between two network elements 18 as well as edit their properties. Manager 20 may also handle situations that disrupt traffic such as adding and deleting a node 12 to communication ring 14, splitting of communication ring 14 into two rings, and merging of two rings into a single ring. Nodes, links, and rings are established by manager 20 through definition by the user or discovery by manager 20.

Figure 3:
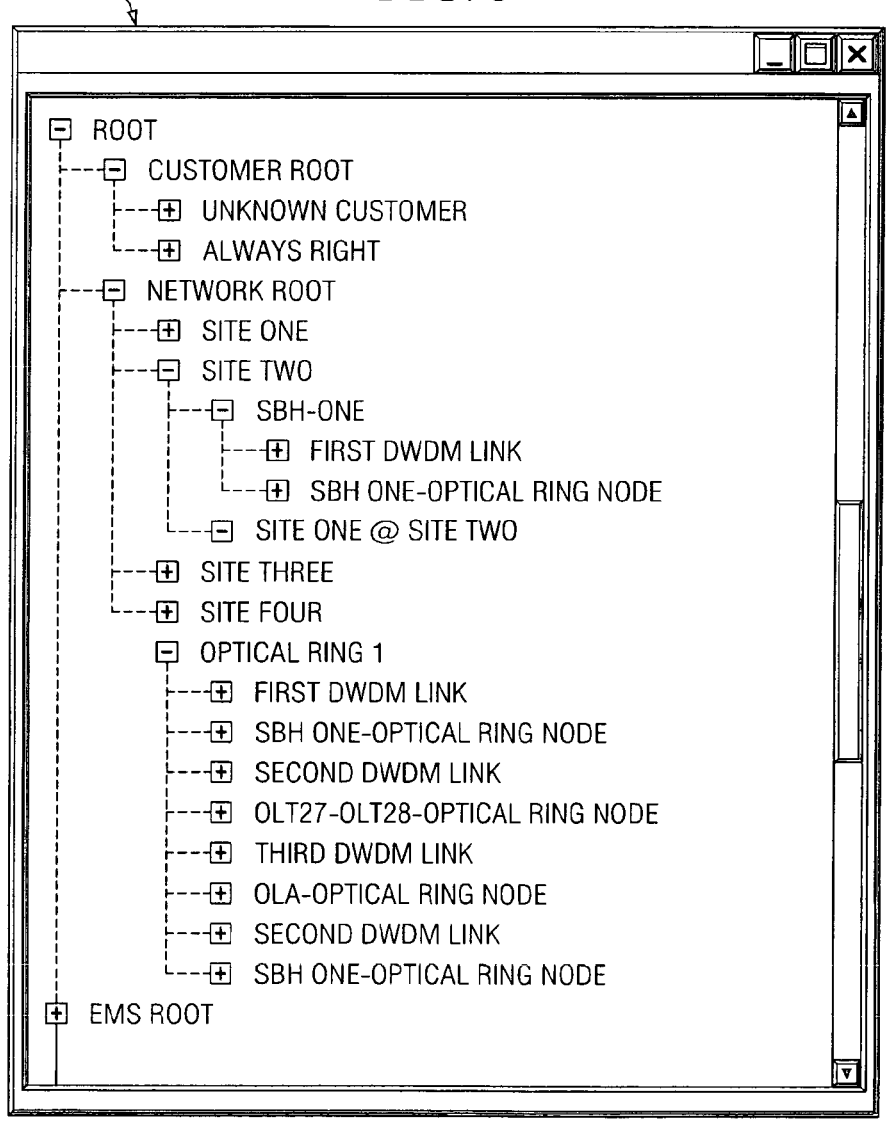
FIG. 3 illustrates an example navigation tree generated by a manager in the telecommunication network.

FIG. 3 shows an example of a navigation tree 300. Manager 20 creates navigation tree 300 to identify the topology of telecommunication network 10. Navigation tree 300 provides an outline of the topology for telecommunication network 10. Navigation tree 300 includes entries for each site, communication ring 14, node 12, network element 18, and link 17 of telecommunication network 10. A site may be a geographical location that includes one or more nodes 12. Definition and discovery of entities within telecommunication network 10 are inserted into navigation tree 300 upon establishment of the topology for telecommunication network 10.

FIG. 4 shows a process flow 400 for discovering a node 12 by manager 20. Manager 20 initiates discovery of a node as a sub-scenario of a user-initiated optical ring discovery request. If a network element is a COADM, SBHOADM, or OLA, the discovery is trivial as the two sides of the network element 18 comprise the node 12. For a pair of OLT units as network elements 18*a* and 18*b* being at node 12*a*, manager 20 first retrieves the local and neighbor identification addresses of a starting network element 18*a* of node 12*a* at block 402. Manager 20 then determines whether there is an existing definition for node 12*a* and the starting network element 18*a* at block 404. If so, manager 20 will validate that the definition matches the network connectivity. Manager 20 retrieves the local and neighbor identification addresses for the defined partner network element 18*b* at block 406. Manager 20 determines whether the addresses of the network elements 18*a* and 18*b* match up to provide a tight loop at block 408. A tight loop occurs when the network elements 18*a* and 18*b* are shown to be chained together to provide a coherent connection. If there is a match, node 12*a* is confirmed at block 410. If there is a conflicting definition, a mismatch alarm is raised at block 412 for the node 12 and node 12*a* is marked as unconfirmed at block 414. If there is no existing node definition, the local and neighbor identification addresses for the network element(s) 18*b* at that site are retrieved at block 416 and matched up to determine whether a tight loop occurs at block 418. If there is a tight loop, node 12*a* has been discovered for the network elements 18*a* and 18*b* at block 420. If a tight loop is not present, there has been no discovery of node 12*a* and a discovery failure is reported at block 422. Once discovered, a node entity for the network elements 18*a* and 18*b* is created at block 424 and the navigation tree 300 is updated at block 426 by adding node 12*a* under each OLT below the network root. The discovered node 12*a* can now be used to support a communication ring 14.

FIG. 5 shows a process flow 500 for defining a node 12 by manager 20. Manager 20 will allow a node 12 to be defined by a user. Once defined, validation of the connectivity of the defined node is performed by node discovery as discussed above. If a node to be defined includes a single network element 18 such as a COADM, SBHOADM, or OLA, the definition is automatic upon creation of the network element 18 since the two sides of these types of network elements 18 comprise a node 12. For an OLT pair as network elements 18*a* and 18*b* at a node 12*a*, manager 20 provides a user an ability to select at block 502 from the navigation tree 300 any OLT as network element 18*a* for node 12*a* that is not already associated with a communication ring 14. The user then selects a second OLT as network element 18*b* at block 504. During selection of network elements 18*a* and 18*b*, the user assigns appropriate values to these entities. Once the OLT pair has been selected, manager 20 creates the node entity at block 506 and updates the navigation tree 300 at block 508 by adding node 12*a* under each of the OLTs below the network root. Node 12*a* can now be used to discover a communication ring 14.

Figure 6:
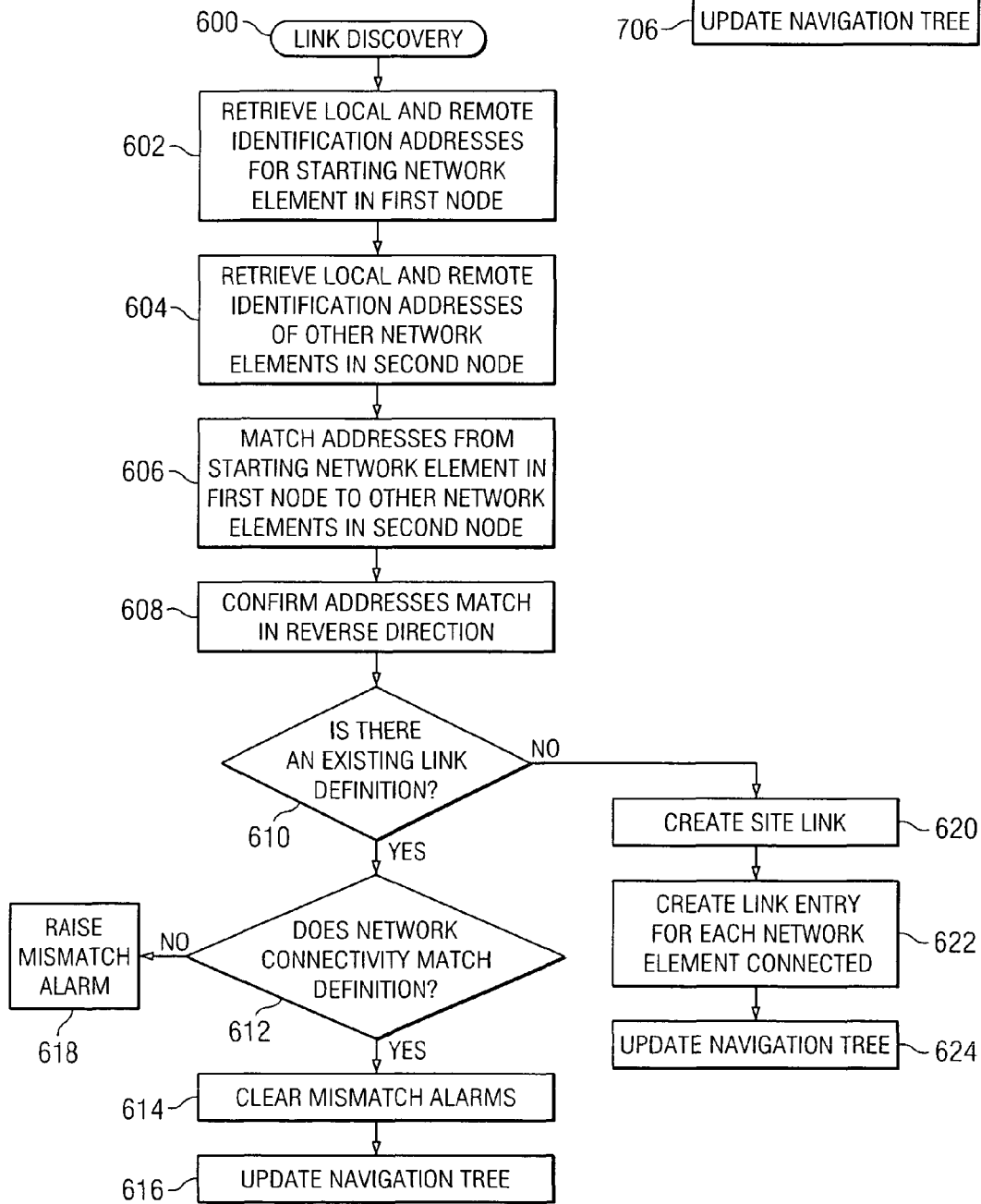
FIG. 6 illustrates a process flow for link discovery in the telecommunication network.

FIG. 6 shows a process flow 600 for discovering a link 17 by manager 20. Manager 20 initiates discovery of a link 17 as a sub-scenario of a user-initiated optical ring discovery request. Manager 20 retrieves the local and remote identification addresses for the starting OLT interfaces of the link 17 at block 602. Manager 20 then retrieves the local and remote identification addresses of other network elements for the link 17 at block 604. Manager 20 then matches up the addresses from the starting interface to those on a different network element interface at block 606. Manager 20 will then confirm that the addresses match in the reverse direction at block 608. Manager 20 determines whether there is an existing definition for link 17 at a specified interface at block 610. If so, manager 20 will validate that the definition matches the network connectivity. If the network connectivity matches the existing definition at block 612, any mismatch alarms are cleared at block 614 and the navigation tree 300 is updated accordingly at block 616. If a mismatch occurs, a mismatch alarm is declared for the link 17 at block 618. A link will not be discovered if a mismatch occurs and connectivity cannot be uniquely determined based on the identification addresses. If there is no existing link definition at block 610, a site link is created at block 620 with a name, distance, and description if one does not already exist. Once discovered, a link entity for the OLT pair is created at block 622 and the navigation tree 300 is updated at block 624 by adding the link under each OLT below the network root. The discovered link can now be used to discover a communication ring 14.

Figure 7:
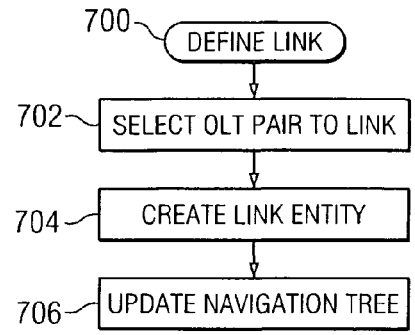
FIG. 7 illustrates a process flow for defining a link in the telecommunication network.

FIG. 7 shows a process flow 700 for defining a link 17 by manager 20. Manager 20 will allow a link 17 to be defined by a user. Once defined, validation of the connectivity of the defined link 17 is performed by the link discovery as discussed above. For an OLT pair, manager 20 provides a user at block 702 an ability to select from the navigation tree 300 any OLT to be linked that is not already associated with a communication ring 14. Once the OLT pair has been selected, manager 20 creates the link entity at block 704 and updates the navigation tree 300 at block 706 by adding the link 17 under each of the OLTs below the network root. The link 17 can now be used to discover a communication ring 14.

Figure 8:
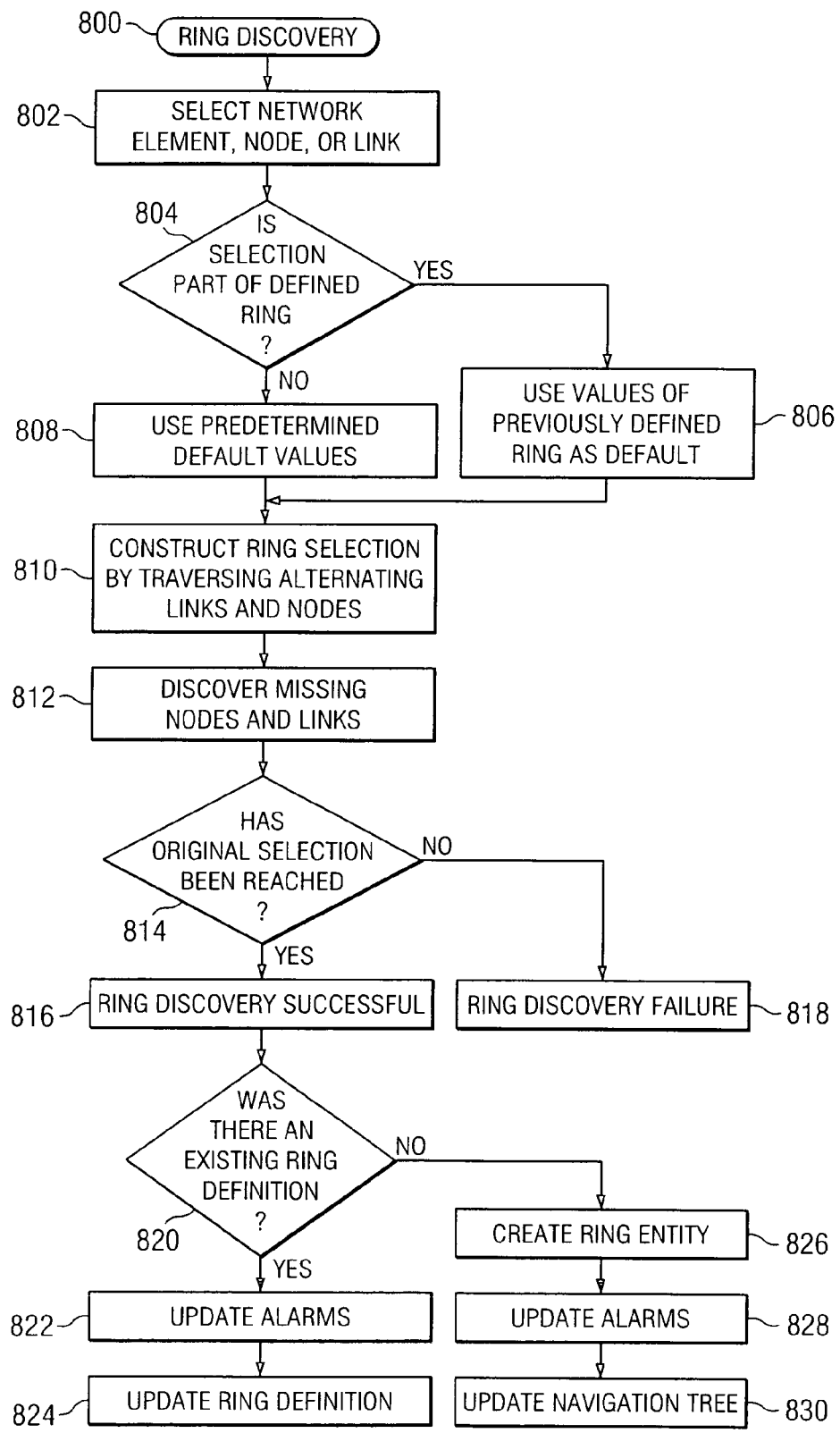
FIG. 8 illustrates a process flow for ring discovery in the telecommunication network.

FIG. 8 shows a process flow 800 for discovering a network topology. Manager 20 provides a system behavior for discovering a physical protection ring. Manager 20 relies on the ability to discover and define links 17 and nodes 12 in order to discover a communication ring 14 topology. Discovery of communication ring 14 is user-invoked. A user selects a network element 18, node 12, or link 17 at block 802 to invoke discovery of the network topology. Manager 20 allows the user to define the name, description, and ring cost for communication ring 14. If the entity from which discovery is invoked is part of a previously discovered communication ring 14 at block 804, values from the previously discovered ring 14 are used as default values at block 806. If not part of a previously discovered communication ring 14, pre-determined default values may be used at block 808. From the invoking entity, manager 20 chooses a direction of travel and attempts to construct communication ring 14 through alternating links 17 and nodes 12 at block 810. If a node 12 or link 17 does not exist, manager 20 will attempt to discover the missing entity at block 812. If manager 20 gets back to the invoking entity during the ring construction at block 814, discovery of communication ring 14 is reported as successful at block 816. If a conflicting entity is detected or a dead end reached, a discovery failure occurs and is reported at block 818. Entities discovered during ring discovery will remain defined despite a discovery failure. If there was an existing ring definition at block 820, manager 20 will update the set of alarms on the ring 14 at block 822 and update the ring definition at block 824 upon successful ring discovery. If there was no existing ring definition at block 820, manager 20 creates a ring entity at block 826 with the values associated therewith, updates the alarms on the ring 14 at block 828, and updates the navigation tree 300 at block 830 by adding the ring entity under the network root and copies the nodes 12 and links 17 beneath the ring entity in the navigation tree 300.

Once a ring 14 has been discovered, manager 20 will allow a user to view and modify the properties of communication ring 14. Quality of service assignments for idle wavelengths can also be modified by the user. The user may view the outstanding network alarms that affect the ability of communication ring 14 to provide service. Manager 20 may also create a report upon request by the user of the characteristics and usage of communication ring 14. The user can select a link 17 and request a wavelength summary report. From an arbitrary staring point, manager 20 will provide node 12 and link properties. A graphical representation of communication ring 14, including nodes 12 and links 17, may be provided by manager 20 upon request. Manager 20 provides access for these features by presenting the navigation tree 300 to the user.

A node 12, a link 17, or a communication ring 14 may be deleted from manager 20 upon request by a user. Discovery of communication ring 14 is irrelevant when deleting a node 12 or link 17. From the navigation tree 300, the user selects the node 12, link 17, or communication ring 14 that is to be deleted. For a link 17 supporting any circuits that have a quality of service other than Dedicated Protection, deletion of the link 17 may not be available. For a communication ring 14 supporting any circuits, the deletion action may not be available. Upon confirmation from the user, manager 20 will delete the node 12, link 17, or communication ring from its configuration and alarm databases. If the node 12 or link 17 was part of an existing communication ring 14, an invalid alarm will be raised with respect to communication ring 14. Manager 20 will then update the navigation tree 300 to remove the node 12, link 17, or communication ring 14.

After discovery of communication ring 14, addition or deletion of a node 12 may be performed through a link deletion and rediscovery action. Circuits with unprotected traffic that would be affected by the addition/deletion of a node 12 are deleted by manager 20 prior to rediscovery of communication ring 14. Links 17 associated with the change in ring topology are deleted and rediscovery of communication ring 14 is initiated. For adding a node 12, pass-through equipment and cross-connections are added at each additional node 12 as required supporting components for communication ring 14. A best effort attempt is made to re-provision and enable the added equipment and cross-connections. For deleting a node 12, equipment and cross-connections at each deleted node 12 are removed from the required supporting components of communication ring 14. Mismatch alarms are detected and raised based on the updated collection of resources required to support the added circuitry. Manager 20 updates the resources now required for communication ring 14.

Figure 9:
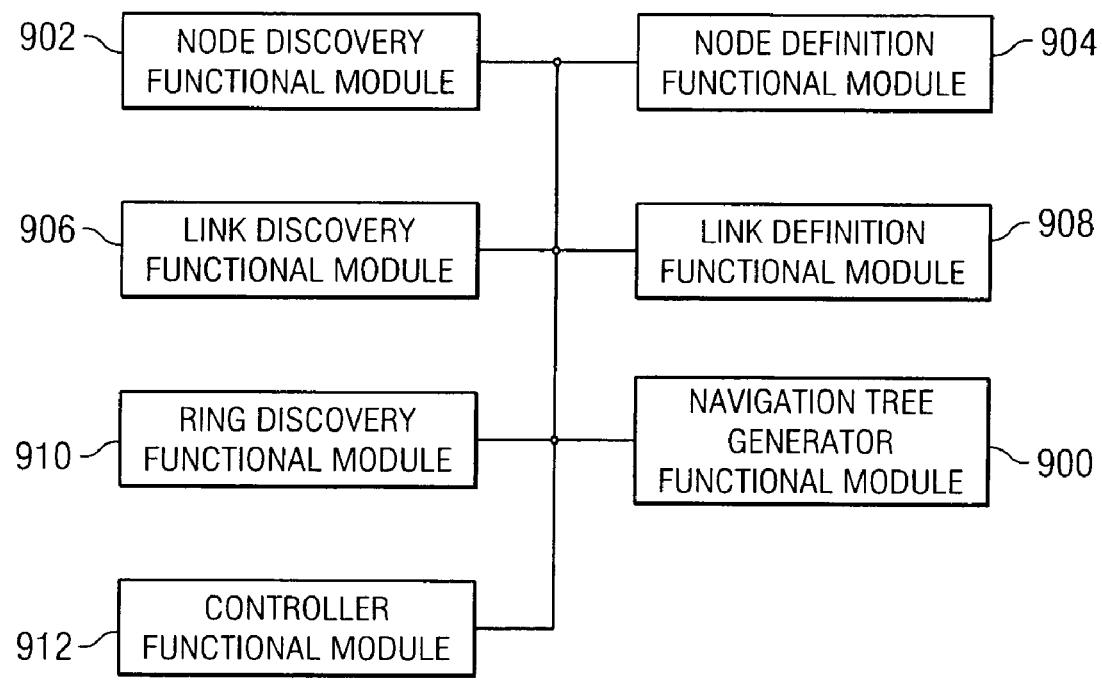
FIG. 9 illustrates a simplified block diagram of the manager in the telecommunication network.

FIG. 9 shows a simplified block diagram of manager 20. Manager 20 may be implemented in hardware, software, a combination of hardware and software, or any other suitable logic or circuitry. Manager 20 may include a navigation tree generator functional module 900, a node discovery functional module 902, a node definition functional module 904, a link discovery functional module 906, a link definition functional module 908, a ring discovery functional module 910, and a controller functional module 912. Though shown as separate functional modules, the operations provided by manager 20 may be included in fewer or more functional modules than depicted here. Each of the functional modules provide particular operations as discussed above. Controller functional module 912 may act as an interface between all functional modules and provide operational control for manager 20.

Manager 20 may also be provisioned to allow a user to define an interconnection link between two network elements 18*a* and 18*b* independent of an end-to-end circuit. From the navigation tree 300, the user selects a network element 18*a* and a source and a destination for the interconnection link. The source and destination include values associated with a site, network element, and port. Selection of ports may be limited to those that are compatible and not cross-connected. Upon selection of the source and destination for the interconnection link, manager 20 creates the interconnection link and adds it to the navigation tree 300 under each of the network elements 18*a* and 18*b* involved below the network root. The interconnection link can now be used for circuit definition. Once created, properties of the interconnection link can be viewed and modified. The properties include the name, description, and cost of the interconnection link. If not being used to support a circuit, an interconnection link may be deleted. Upon selection of an interconnection link, manager 20 verifies that the interconnection link is not being used in a circuit and removes it from the database. Manager 20 then updates the navigation tree 300 to reflect removal of the interconnection link.

The present invention may apply to various implementations of telecommunication network 10. For example, communication ring 14 may also be a Synchronous Optical Network (SONET) ring, a unidirectional path switched ring (UPSR), or any other type of conventional ring implementation. Links 17 may be DWDM links, carrier circuits, or any conventional interface implementations between network elements 18. Moreover, though discussed in terms of a node having two network elements, the functionalities of the node may be split across multiple network elements according to a desired design of telecommunication network 10. The present invention allows a coherent view of a ring, nodes in the ring, and links therein, especially when a node is supported by two or more network elements. As a result, a node can be discovered, defined, and managed despite having its functionality split across more than one network element.

Thus, it is apparent that there has been provided, in accordance with the present invention, a system and method for managing a node across two network elements that satisfies the advantages set forth above. Although the present invention has been described in detail, various changes, substitutions, and alterations may be readily ascertainable by those skilled in the art and may be made herein without departing from the spirit and scope of the present invention as set out in the appended claims. Moreover, the present invention is not intended to be limited in any way by any statement made herein that is not otherwise reflected in the following claims.

What is claimed is:

1. A system for managing a node split across multiple network elements, comprising:
   a communication ring having a plurality of links;
   a plurality of nodes coupled in the communication ring by the plurality of links, a particular one of the plurality of nodes having at least two network elements supported therein; and
   a manager, configured to manage a node split across multiple network elements and configured to provide a coherent view of the at least two network elements in the node of the communication ring, the manager further configured to discover the particular one of the plurality of nodes by matching identification addresses of the at least two network elements to identify a coherent connection between the at least two network elements at the particular one of the plurality of nodes, the manager still further configured to create a navigation tree accessible by a user and to provide the coherent view through the navigation tree.

2. The system of claim 1, wherein the communication ring is a synchronous optical network ring.

3. The system of claim 1, wherein the communication ring is a unidirectional path switched ring.

4. The system of claim 1, wherein the at least two network elements supported in the particular one of the plurality of nodes are optical line termination units.

5. The system of claim 1 the navigation tree being updated by the manager based on the particular one of the plurality of nodes being discovered.

6. A method for managing a node split across multiple network elements, the method comprising:
   retrieving local and neighbor identification addresses of a first network element supporting a potential node associated with a telecommunication network;
   determining whether a node definition exists for the potential node being supported by the first network element;
   retrieving local and neighbor identification addresses of a second network element supporting the potential node in response to a non-existence of the node definition;
   determining whether the identification addresses of the first and second network elements match up to provide a coherent connection between the first and second network elements at the potential node;
   creating a node entity for the telecommunication network having the first and second network elements in response to the identification addresses providing a coherent connection between the first and second network elements; and
   creating a representation of the node entity for the node and the first and second network elements in a navigation tree accessible to a user.

7. The method of claim 6, further comprising: reporting a discovery failure in response to the identification addresses not providing a coherent connection.

8. The method of claim 6, further comprising:
   retrieving local and neighbor identification addresses of a second network element supporting the node in response to the existence of the node definition, the second network element being a previously defined partner of the first network element;
   determining whether the identification addresses provide a coherent connection between the first and second network elements; and
   confirming the node definition in response to the identification addresses providing a coherent connection.

9. The method of claim 8, further comprising:
   raising a mismatch alarm in response to the identification addresses not providing a coherent connection.

10. The method of claim 6, wherein associating the node with the telecommunication network is provided by automatic discovery or in accordance with user definitions.

11. The method of claim 6, further comprising:
   retrieving local and neighbor identification addresses of a network element in a first node associated with a link of the telecommunication network;
   retrieving local and neighbor identification addresses of a network element in a second node associated with the link;
   determining whether the identification addresses provide a coherent connection between the first and second nodes;
   determining whether a link definition exists for the link between the first and second nodes; and
   associating the link with the telecommunication network in response to the identification addresses providing a coherent connection.

12. The method of claim 11, further comprising:
   creating a link entity for the link and the first and second nodes in the navigation tree accessible to the user.

13. The method of claim 11, further comprising:
   constructing the communication ring topology for the telecommunication network in response to the node and link entity discovery.

14. The method of claim 13, further comprising:
   creating a ring entity for the communication ring in a navigation tree accessible to the user.

15. The method of claim 6 the navigation tree being updated with the representation of the node entity for the node based on the identification addresses of the first and second network elements matching up to provide a coherent connection between the first and second network elements at the potential node.

16. A method for managing a node split across multiple network elements, the method comprising:
   discovering one or more nodes coupled to a communication ring of a telecommunication network, at least a particular one of the one or more nodes being supported by two or more network elements, discovery of the particular one of the one or more nodes includes matching identification addresses of the two or more network elements to identify a coherent connection between the two or more network elements at the particular one of the one or more nodes;
   discovering one or more links coupling the one or more nodes in the communication ring;
   discovering the communication ring topology in response to discovery of the one or more nodes, the one or more network elements supporting the one or more nodes, and the one or more links coupled to the one or more nodes; and
   generating a navigation tree that represents discovered nodes, network elements, and links for the communication ring.

17. The method of claim 16, wherein discovering the nodes, links, or ring is performed automatically by a manager of the telecommunication network.

18. The method of claim 16, wherein discovering the nodes, links, or ring is performed by user definition through a manager of the telecommunication network.

19. The method of claim 16, further comprising:
managing two or more network elements supporting a single node in response to discovery thereof.

20. The method of claim 16 said discovering of the one or more links including matching first identification addresses for a starting network element in a first node to second identification addresses of other network elements in a second node and confirming that the first and the second identification addresses match in a reverse direction.

21. A system for managing a node split across multiple network elements, comprising:
a communication ring having a plurality of links;
a plurality of nodes coupled in the communication ring by the plurality of links, a particular one of the plurality of nodes having at least two network elements supported therein; and
a manager, managing a node split across multiple network elements, configured to provide a coherent view of the two network elements in the node of the communication ring, the manager configured to discover the particular one of the plurality of nodes by matching identification addresses of the two or more network elements to identify a coherent connection between the two or more network elements at the particular one of the plurality of nodes, the manager further configured to be operably interconnected to at least one functional module to discover details of the nodes, network elements, and links and generate a navigation tree using the discovered details.

22. The system of claim 21, wherein the at least one functional module is a node functional module configured to discover and define identities of the node.

23. The system of claim 21, wherein the at least one functional module is a network element functional module configured to discover and define identities of the two or more network elements.

24. The system of claim 21, wherein the at least one functional module is a link functional module configured to discover and define identities of the link.

25. The system of claim 21, wherein the at least one functional module is a controller functional module configured to update the navigation tree.

26. A method for managing a node split across multiple network elements, comprising:
retrieving local and neighbor identification addresses of a first network element supporting a potential node associated with a telecommunication network;
determining whether a node definition exists for the potential node being supported by the first network element;
retrieving local and neighbor identification addresses of a second network element supporting the potential node;
determining whether the identification addresses of the first and second network elements match to provide a coherent connection between the first and second network elements at the potential node;
creating a node entity for the telecommunication network having the first and second network elements in response to the identification addresses; and
managing the identification addresses via a manager configured to manage a node split across multiple network elements, the manager being operably interconnected to at least one functional module to discover details of the nodes, network elements, and links and generate a navigation tree using the details discovered.

27. A method for managing a node split across multiple network elements, comprising:
discovering one or more nodes coupled to a communication ring of a telecommunication network, at least a particular one of the one or more nodes being supported by two or more network elements, said discovering of the one or more nodes includes matching identification addresses of the two or more network elements to identify a coherent connection between the two or more network elements at the particular one of the one or more nodes;
discovering one or more links coupling the one or more nodes in the communication ring, said discovering of the one or more links includes matching first identification addresses for a starting network element in a first node to second identification addresses of other network elements in a second node and confirming that the first and the second identification addresses match in a reverse direction;
discovering the communication ring topology in response to discovery of the one or more nodes, the two or more network elements supporting the one or more nodes, and the one or more links coupled to the one or more nodes; and
managing the identification addresses via a manager configured to manage a node split across multiple network elements, the manager being operably interconnected to at least one functional module to discover details of the nodes, network elements, and links and generate a navigation tree using the details discovered.

* * * * *